United States Patent [19]

Word et al.

[11] Patent Number: 5,294,450

[45] Date of Patent: Mar. 15, 1994

[54] COLORLESS FLAVORED MALT BEVERAGE AND METHOD FOR MAKING THE SAME

[75] Inventors: Kathryn M. Word, Golden; Richard L. Pflugfelder, Lakewood; John A. Neu; Gregory P. Head, both of Denver; Hugo Patino, Lakewood, all of Colo.

[73] Assignee: Coors Brewing Company, Golden, Colo.

[21] Appl. No.: 15,391

[22] Filed: Feb. 9, 1993

[51] Int. Cl.$^5$ ............................ C12G 3/00; C12H 1/00
[52] U.S. Cl. .......................................... 426/11; 426/7; 426/16; 426/592
[58] Field of Search ...................... 426/7, 11, 592, 423, 426/16, 28, 29, 262

[56] References Cited

U.S. PATENT DOCUMENTS

| | | |
|---|---|---|
| 1,455,397 | 3/1923 | Heuser . |
| 2,803,546 | 8/1957 | Bergmann et al. . |
| 3,168,449 | 2/1965 | Hollenbeck et al. . |
| 3,332,779 | 7/1967 | Krabbe et al. . |
| 3,798,331 | 3/1974 | Bavisotto .............................. 426/16 |
| 3,852,495 | 12/1974 | Schimpf et al. . |
| 3,908,021 | 9/1975 | Rehberger et al. . |
| 4,021,580 | 5/1977 | Raymond et al. ..................... 426/16 |
| 4,021,580 | 5/1977 | Raymond et al. . |
| 4,272,552 | 6/1981 | Zastrow . |
| 4,355,047 | 10/1982 | Line et al. . |
| 4,355,110 | 10/1982 | Line et al. . |
| 4,430,348 | 2/1984 | Duncombe et al. . |
| 4,440,795 | 4/1984 | Goldstein et al. . |
| 4,495,204 | 1/1985 | Weaver et al. . |
| 4,528,198 | 7/1985 | Mizerak et al. . |
| 4,666,718 | 5/1987 | Lowery et al. . |
| 4,746,518 | 5/1988 | Schur .................................... 426/15 |
| 4,816,280 | 3/1989 | Billings . |
| 4,837,034 | 6/1989 | Owades et al. . |

OTHER PUBLICATIONS

Dialog Data Base, File 79, (Foods Adlibra) Dialog Acc. No. 0317488, Abstracting USA Today Nov. 26, 1991 p. 1B.

Hackh's Chemical Dictionary, Julius Grant, 4th Ed. 1969, McGraw Hill, New York, p. 605.

*Methods of Analysis of the American Society of Brewing Chemists,* 8th ed., p. Beer-13 (1992).

Rautureau, M., et al., "Structural Analysis of Sepiolite by Selected Area Electron Diffraction-Relations with Physio-Chemical Properties", *Clays and Clay Minerals,* 24: 43-49 (1976).

Amero, R. C., "Fullers Earth, A General Review", *Transactions AIEM: Mining Engineering,* May, 1951 (pp. 441-446).

Yau, N. J. N., et al., "Carbonation Interactions with Sweetness and Sourness", *Journal of Food Science.* 57(6): 1412-1416.

Pollock, J. R. A. (ed.), *Brewing Science,* Academic Press, London, vol. 2, pp. 167, 188-189 (1981).

*Primary Examiner*—Joseph Golian
*Assistant Examiner*—Curtis E. Sherrer
*Attorney, Agent, or Firm*—Klaas, Law, O'Meara & Malkin

[57] ABSTRACT

A colorless malt beverage product. To produce the product, malt and water are combined in a mash. An enzyme is preferably added to convert non-fermentable sugars to fermentable sugars. The mash is heated, and liquid extracted therefrom. The liquid is combined with a fermentable carbohydrate to yield a mixture which is boiled and combined with yeast. The resulting yeast-fermented product is decolorized to produce a clear/colorless base which is combined with a sweetener, tartaric acid, a buffer, and a flavoring agent, followed by carbonation until the product is about 0.48-0.57% by weight $CO_2$. The completed product is clear/colorless, has an alcohol : real extract weight % ratio of 1 : 0.4 to 1 : 1.5, and has 8-15 calories/ounce. These parameters minimize consumer sensations of fullness and excess tartness/sweetness/astringency, while producing desirable taste characteristics and an attractive appearance.

27 Claims, No Drawings 5,294,450

1

COLORLESS FLAVORED MALT BEVERAGE AND METHOD FOR MAKING THE SAME

BACKGROUND OF THE INVENTION

The present invention generally relates to the production of alcohol-containing malt beverages, and more particularly to the production of a clear, colorless, and flavored alcohol-containing malt beverage which minimizes sensations of fullness, excess tartness, excess sweetness, and astringency typically experienced by consumers of traditional flavored malt beverages.

In order to satisfy consumer demand for new and different alcohol based beverages, substantial research has been conducted regarding the development of flavored malt beverage products. For example, the production of flavored malt beverages and other malt beverage products is disclosed in the following U.S. Pat. Nos.: 1,455,397; 2,803,546; 3,332,779; 3,798,331; 3,908,021; 4,021,580; 4,495,204; and 4,816,280. Notwithstanding the foregoing patents and products/processes disclosed therein, a need remains for a flavored alcohol-containing malt beverage which minimizes and/or substantially avoids sensations of fullness experienced by individuals upon consuming moderate quantities of the beverage. Typical sensations of fullness experienced by consumers of conventional malt beverages involve feelings of over-consumption and satiation after consuming only moderate amounts of product. Sensations of fullness experienced by malt beverage consumers are normally caused by substantial quantities of non-fermentable sugars in the beverages being consumed. Exemplary non-fermentable sugars include but are not limited to malt-based oligosaccharides such as maltotetraose, maltopentaose, and various branched beta-limit dextrins.

In addition, a need/demand exists for a flavored alcohol-containing malt beverage which minimizes and/or substantially avoids sensations of excess tartness, excess sweetness, and astringency typically experienced by consumers of traditional flavored malt beverages. In general, the palatability of malt beverage products is not only influenced by the specific ingredients being used, but also how such ingredients interact with each other. For example, the use of different acid materials in malt beverage products ultimately results in distinctive flavors which interact in an unpredictable manner with dissolved $CO_2$ (e.g. carbonation) to produce varying levels of tartness, sweetness, and/or astringency. Excess levels of tartness, sweetness, and/or astringency can produce a final product which is unacceptable to the consuming public. Thus, with respect to malt beverage products, the development of specific beverages with desired/acceptable levels of tartness, sweetness, and astringency does not merely involve the addition of an acid, a flavoring agent, or the like when a specific taste characteristic is desired. Instead, the creation of a malt beverage product with desired taste characteristics not only requires the addition of specific acids, flavoring agents, and the like, but also requires the consideration of a wide variety of other factors. These other factors again include but are not limited to carbonation level, as well as the alcohol level, sugar levels, the relative proportions of alcohol and sugar levels, and the raw materials (e.g. malt and/or fermentable carbohydrates) which are used. Accordingly, the development of flavored malt beverages and other brewed products with desired taste characteristics is an unpredictable process which requires substantial amounts of research and development activity.

In addition to avoiding the above-described sensations of fullness, excess sweetness, excess tartness, and astringency, a need exists for a malt beverage product which is not visually perceived by consumers as being filling or satiating. For example, consumers typically associate darkly-colored malt beverage products with heaviness and a high alcohol content. Thus, a need exists for a malt beverage product having a pleasant, non-heavy appearance which is attractive to consumers.

The present invention effectively satisfies all of the foregoing needs and demands, and results in a product with highly desirable and unique taste characteristics. Accordingly, the product and process described herein represent an advance in the art of malt beverage production, as described in greater detail below.

SUMMARY OF THE INVENTION

It is an object of the present invention to provide an improved malt beverage product and method for making the same.

It is another object of the invention to provide an improved malt beverage product and method for making the same which is readily manufactured using a minimal number of process steps.

It is another object of the invention to provide an improved malt beverage product and method for making the same wherein the resulting product minimizes sensations of fullness experienced by consumers of the product.

It is a further object of the invention to provide an improved malt beverage product and method for making the same wherein the resulting product minimizes sensations of excess tartness, excess sweetness, and astringency experienced by consumers of the product.

It is a still further object of the invention to provide an improved malt beverage product and method for making the same wherein the resulting product has a light visual appearance which reinforces the foregoing product attributes and is highly attractive to consumers.

It is an even further object of the invention to accomplish all of the foregoing goals while producing a flavored malt beverage product which has desirable and unique taste characteristics.

In accordance with the foregoing objectives, the present invention involves a colorless, flavored malt beverage product and method for making the same. Compared with traditional malt beverages, the product of the present invention minimizes sensations of fullness experienced by consumers, as well as sensations of excess tartness, excess sweetness, and astringency. In addition to these characteristics, the malt beverage product described herein has a pleasing and light visual appearance which is highly attractive to consumers.

To produce the foregoing malt beverage product, malt and water are combined to form a mash having both fermentable and non-fermentable sugars therein. Thereafter, in a preferred embodiment, an enzyme is added to the mash which is capable of breaking down non-fermentable sugars to fermentable sugars. This is an important step in the production process, since the fermentable sugars produced from the non-fermentable sugars can ultimately be converted to alcohol during fermentation as described below. The absence of non fermentable sugars also reduces the calorie content of the final product, and minimizes sensations of fullness in consumers compared with malt beverages having substantial amounts of unconverted non-fermentable sugars therein. In an alternative embodiment, the use of special malt compositions having a "high diastatic power" may be used instead of or in addition to the foregoing enzyme. High diastatic power malt compositions include a substantial amount of natural enzymes therein (e.g. alpha and beta amylases) which convert non-fermentable sugars to fermentable sugars.

The mash is then heated, followed by the extraction of liquid from the mash. The extracted liquid is conventionally known as "wort". The wort is thereafter boiled and (preferably during boiling) combined with a supply of a fermentable carbohydrate (e.g. corn syrup) to form a fermentable mixture. Hop materials and/or hop extract may also be added to the boiling mixture, if desired. The fermentable mixture is then allowed to settle, followed by cooling of the mixture. Yeast is then added to the mixture which is allowed to ferment for a time period sufficient to convert the fermentable carbohydrate and above-described fermentable sugars in the mixture into alcohol (e.g. ethanol), thereby producing a fermented product.

The fermented product is thereafter decolorized to create a clear and colorless alcohol-containing malt beverage base. In an alternative embodiment, decolorization may take place after boiling as described above, but prior to fermentation. Decolorization is preferably accomplished by contacting the fermented product with activated carbon. Alternatively, the fermented product may be decolorized by placing it in contact with conventional sepiolite materials, although the use of activated carbon is preferred.

After the removal of residual solids and activated carbon (if used) from the malt beverage base (e.g. by settling, filtration or a combination of both), a variety of different ingredients are then added to the malt beverage base. Specifically, the malt beverage base is preferably combined with a sweetening agent (e.g. corn syrup), tartaric acid, at least one optional secondary acid (e.g. citric acid or other acid different from tartaric acid which is present in an amount not exceeding the amount of tartaric acid being used), a buffer (e.g. sodium citrate), and a selected flavoring agent. In addition, an optional antifoaming agent and one or more preservatives (e.g. sodium benzoate, potassium sorbate, or a combination of both) may also be added if desired.

The resulting malt beverage product may then be subjected to additional filtration steps if desired or needed. Finally, while the fermentation process set forth above (which involves the generation of $CO_2$) will provide some natural carbonation in the malt beverage product, additional carbonation is undertaken in order to increase the carbonation level thereof so that the final malt beverage product have a carbonation level of about 0.48-0.57% by weight $CO_2$.

In a preferred embodiment, the final malt beverage product will contain about 95.4-99.8% by weight of the clear and colorless malt beverage base, about 0.1-4.0% by weight sweetening agent, about 0.05-0.25% by weight tartaric acid, about 0-0.05% by weight secondary acid, about 0.05-0.30% by weight flavoring agent, about 0.001-0.005% by weight buffer, about 0-0.003% by weight antifoaming agent, and about 0-0.10% by weight anti-microbial preservative (e.g. a single preservative or multiple preservatives in combination).

In accordance with the foregoing production steps, materials, and other parameters, the resulting malt beverage product will be clear and colorless, will have an alcohol : real extract weight % ratio of about 1 : 0.4 to 1 : 1.5, a real extract (total sugar) content of about 3.5-4.2% by weight, and a calorie content of about 8-15 calories/ounce of product. The foregoing calorie content, alcohol : real extract ratio, real extract content, carbonation level, and tartaric acid level are especially important in that they cooperate to minimize and/or substantially avoid sensations of fullness, excess tartness, excess sweetness, and astringency which are normally experienced by consumers of traditional flavored malt beverages. In addition, the clear/colorless character of the product also provides a fresh, clean, and non-heavy appearance which is highly attractive to consumers and reinforces the non filling nature of the product. Finally, the ingredients, parameters, and production steps described herein result in a malt beverage product which has unique and highly desirable taste characteristics.

These and other objects, advantages, and features of the present invention shall be described below in the following Detailed Description of Preferred Embodiments.

DETAILED DESCRIPTION OF PREFERRED EMBODIMENTS

The present invention involves a colorless, flavored malt beverage product and method for producing the same. As previously indicated, the malt beverage product described herein has numerous functional attributes, as well as desirable taste/appearance characteristics. For example, the product is designed to minimize and/or substantially avoid sensations of fullness which are typically experienced by consumers of conventional malt beverage products. Likewise, the product is formulated to minimize and/or substantially avoid consumer sensations of excess tartness, excess sweetness, and astringency. In addition, the product is clear and colorless, which provides numerous benefits. Aside from enhanced aesthetic value, the clear/colorless appearance of the product visually reinforces the low calorie, non-filling nature of the product. As noted above, the clear/colorless character of the product also provides a fresh and clean appearance which is highly attractive to consumers. Finally, the parameters, ingredients, and production steps described below accomplish all of the foregoing goals while producing a product which having unique and highly desirable taste/flavor characteristics.

To produce the malt beverage product of the present invention, a supply of malt is first obtained. The malt may be of any conventional type known in the art which is suitable for producing beer and other brewed beverages. An exemplary malt appropriate for use in the present invention is derived from the barley variety "Moravian" obtained from the Coors Brewing Company of Golden Colorado (USA). The malt is then combined with water and heated to a temperature of about 122° F. ($\pm 2°$ F.) to produce a mash. This temperature is preferably maintained for about 26 minutes. In preferred embodiment, approximately 0.30-0.70 gallons of water are used per lb. of malt. At this stage the mash will contain various malt-derived fermentable sugars (e.g. including but not limited to maltose and maltotriose). The term "fermentable sugars" as used herein involves small molecular weight sugars which are fermentable by yeast into alcohol (e.g. ethanol). However, the mash will also include various malt-derived non-fermentable sugars (e.g. including but not limited to maltotetraose and maltopentaose). The term "non fermentable sugars" as used herein shall involve large molecular weight sugars conventionally known as "oligosaccharides" which are not convertible to alcohol by yeast. Substantial quantities of non-fermentable sugars which remain in the mash will produce a final beverage product having a relatively high total sugar level compared to the amount of alcohol therein. As a result, such a product will be high in calories, and will create sensations of "fullness" in consumers when moderate amounts of the product are consumed. Typical sensations of fullness experienced by consumers of conventional malt beverages involve feelings of over-consumption and satiation after consuming only moderate amounts of product.

In order to avoid the presence of non-fermentable sugars in the malt beverage product of the present invention, steps are taken to break down the non-fermentable sugars into fermentable sugars which may thereafter be converted to alcohol. To accomplish this in a preferred embodiment of the present invention, an enzyme is added to the completed mash which is capable of breaking down the non-fermentable sugars to fermentable sugars. For example, the foregoing non-fermentable sugars will be converted into simple, fermentable sugars including but not limited to glucose and maltose. As a result, substantially all of the sugars in the mash will ultimately be converted into alcohol during the fermentation stage of the production process described below. The elimination of non fermentable sugars in this manner creates a lower calorie product which is characterized by a favorable alcohol : total sugar ratio as will be described in greater detail below. From a consumer perspective, the resulting product will also minimize and/or substantially avoid sensations of fullness which are normally experienced by consumers of conventional malt beverage products. Furthermore, addition of the enzyme as early as possible in the process of the present invention (e.g. immediately following mash production and before fermentation) will ensure that sugar conversion occurs with a maximum degree of efficiency and completeness (which, in part, is achieved by the higher temperatures used at this stage of the production process).

Exemplary enzymes suitable for the conversion of non-fermentable sugars to fermentable sugars include but are not limited to amyloglucosidase, pullulanase, and limit dextrinase, all of which are commercially available from a wide variety of sources. For example, amyloglucosidase (which is the preferred enzyme to be used herein) is commercially available from Novo Nordisk Bio-Industries, Inc. of Danbury CT (USA) under the name "AMG-200". Regarding the amount of enzyme to be used, about 0.001 –0.003 lbs. of enzyme are preferably used per lb. of mash.

In addition to or instead of using an enzyme for sugar conversion, a special type of malt may be employed. Specifically, a malt having "high diastatic power" can be used to manufacture the foregoing mash. The term "high diastatic power" basically involves a malt which includes increased amounts of natural enzymes therein (e.g. alpha and beta amylases) which convert fermentable sugars to non-fermentable sugars. High diastatic power malts are commercially available from a number of sources, including but not limited to the Great Western Malting Company of Vancouver Wash. (USA) and Schreier Malting Co. of Sheboygan Wis. (USA). For the purposes of this invention, the term "high diastatic power malts" shall be defined to involve and encompass malt materials having a diastatic power value of at least 300 (e.g. involving total enzyme activity) and an alpha amylase value of at least 60 (e.g. involving alpha amylase activity). The foregoing terms ("diastatic power value" and "alpha amylase value") represent standard rating terms relative to enzymatic activity, the meanings of which are well known in art of malt production/formulation. Regarding the use of a high diastatic power malt to form a mash, about 0.30–0.70 gallons of water will preferably be used per lb. of high diastatic power malt.

Next, the mash is heated in order to accomplish "conversion". The term "conversion" as used herein basically involves the chemical conversion of starches in the mash to sugars. In a preferred embodiment, the temperature of the mash (e.g. after enzyme addition, if used) is raised to about 150° F. and maintained at this temperature for about 40 minutes. Thereafter, the temperature is further increased to about 162 F. After maintaining this temperature for about 10 minutes, the temperature of the mash is again increased to about 172° F. and held at this level for about 5 minutes. The foregoing sequence effectively accomplishes conversion, although the above described temperature levels and time intervals may be suitably adjusted (if necessary) in accordance with the starting materials used to produce the mash. Thus, the present invention shall not be limited to the time intervals and temperature levels set forth above which are provided for example purposes.

Next, the mash is physically treated in order to remove solids therefrom (e.g. barley seed husks and the like). In a preferred embodiment, the mash is transferred into a conventional filtration apparatus known as a "lauter tun" or, in the alternative, any apparatus known in the brewing art which is suitable for filtering mash. If a lauter tun is used (which basically involves a tank with a screen-type filter therein), the bottom of the tank is filled with a supply of water (e.g. about 1600–1800 gallons) which is preferably maintained at a temperature of about 172° F. This water (along with additional quantities of water if necessary or desired) is ultimately used to spray the collected solid materials retained by the filter within the lauter tun to remove desired liquid materials therefrom. As a result, a liquid filtrate is collected which is conventionally known as "extract" or "wort". The wort is then transferred to a brew kettle wherein the temperature thereof is increased until boiling occurs (e.g. until the wort reaches a temperature of about 208°–212° F.). Total boiling time is preferably about 90 minutes. After 20 minutes of boiling, a fermentable carbohydrate is added to the boiled wort. Exemplary fermentable carbohydrates suitable for use in the present invention include but are not limited to dextrose, sucrose, and corn syrup, with corn syrup being preferred. If used, the corn syrup is preferably of a type which is at least 95% fermentable (commercially available from Cargill, Inc. of Memphis Tenn. (USA) under the name "Isoclear 55"). This value relates to the overall fermentable sugar content therein (e.g. the amount of glucose and other fermentable sugars in the syrup). In a preferred embodiment, about 1.4–1.8 lbs. of fermentable carbohydrate (e.g. corn syrup) are added per gallon of wort so that the carbohydrate/wort mixture will preferably contain about 12–18% by weight fermentable carbohydrate. The fermentable carbohydrate is used as the primary source of fermentable sugars in the wort for the production of ethanol as described in greater detail below.

After adding the fermentable carbohydrate to the wort, hop materials may also be added, if desired. The term "hop materials" as used herein may encompass a wide variety of different products, including but not limited to hop cones, pre-isomerized pelletized hops, and/or solvent-extracted concentrated hop extract. The amount of hop materials added to the wort may vary, although if hop extract is used, it is preferred that about 0.0003–0.0007 lbs. of hop extract be added per each gallon of wort so that the final wort (including the fermentable carbohydrate) will contain about 0.003–0.007% by weight hop extract. It should be noted that the hop materials (as well as the fermentable carbohydrate) may be added either before, during or after boiling of the wort, although it is preferred that these materials be added during boiling. Furthermore, during boiling, an optional supply of zinc sulfate may be added to the wort. This material functions as a nutrient for promoting the growth/metabolic activities of yeast during the fermentation stage of the production process. The zinc sulfate is preferably added in amount equal to about 0.00001–0.00003 lbs. of zinc sulfate per gallon of wort so that the wort (after addition of the fermentable carbohydrate and hop materials thereto) will contain about 0.0001–0.0004% by weight zinc sulfate. In addition, it should be noted that other commercially-available yeast nutrient/food preparations may also be optionally added at this stage to supplement the nutritional quality of the wort so that optimal yeast performance during fermentation may be achieved.

After the completion of boiling, the wort (hereinafter designated as the "fermentable mixture") is preferably transferred into a conventional whirlpool/settling system where it is allowed to settle for a period of about 35–45 minutes. The clarified fermentable mixture (after the removal of settled solids therefrom by decantation/flocculation processes known in the art) is then cooled to about 46°–48° F. by passage thereof through a conventional heat exchanger system, and maintained at this temperature for about 1.0 hour. The cooled fermentable mixture is thereafter transferred into a fermentation tank where it is injected with sterile air preferably until the fermentable mixture contains about 8 ppm of $O_2$ therein (as determined conventionally using a known $O_2$ detecting system). Oxygenation in this manner is designed to provide an optimum growth environment for yeast materials within the fermentable mixture as described below. At this point, the fermentable mixture will have a fermenter-fill balling of 17.0° P. ($\pm 0.1°$ P.) which basically signifies the amount of "real extract" (e.g. total amount of sugars) therein.

Next, the fermentation process used to produce the malt beverage product of the present invention is initiated. A supply of yeast is first obtained. A wide variety of specific yeasts known in the art for producing brewed beverages may be used including but not limited to *Saccharomyces uvarum* (preferred), as well as *Saccharomyces cerevisiae*. The yeast should be added in an amount sufficient to achieve a yeast cell count of about 12–60 million cells per ml of fermentable mixture. This may be accomplished in the present invention by adding about 0.05–0.45 lb. of yeast (e.g. *Saccharomyces uvarum*) per gallon of fermentable mixture.

During fermentation, the fermentable mixture/yeast combination is maintained at a temperature of between about 48°–60° F. (e.g. optimally about 52.7° F.). Fermentation is allowed to continue until it is determined that there are no fermentable sugars left in the mixture. This is accomplished by conventional testing procedures including but not limited to a density analysis of the mixture, as well as the use of preliminary pilot studies in order to determine the necessary time frame for complete fermentation to occur. Normally, the amount of time required to accomplish complete fermentation is about 7–11 days. Fermentation time is dependent on numerous factors, including but not limited to temperature. Warmer temperatures typically result in faster fermentation, although excessive heat (e.g. temperatures above about 64° F.) may present significant problems, and should be avoided.

After fermentation is completed, an alcohol-containing fermented product is generated which is cooled to a temperature of about 38°–42° F. using a conventional heat exchanger system or the like. Yeast from the fermented product is allowed to settle out of the product, and is thereafter removed by conventional decantation/flocculation techniques. The fermented product is thereafter decolorized in order to produce a clear and colorless alcohol-containing malt beverage base. The numerous benefits associated with the production of a clear and colorless malt beverage base will be described in greater detail below. In a preferred embodiment, there are two primary methods which may be employed to achieve decolorization (hereinafter known as "primary decolorization"). First, the preferred method involves the use of activated carbon which is placed in direct physical contact with the fermented product. It should be noted that primary decolorization using activated carbon (or other decolorization techniques) can also be undertaken after boiling of the fermentable mixture in the brew kettle and prior to fermentation. While it is preferred that primary decolorization be initiated after fermentation, pre fermentation decolorization shall be deemed equivalent to post-fermentation decolorization for the purposes of this invention.

To accomplish primary decolorization using activated carbon, a supply of activated carbon is first obtained. An exemplary activated carbon product suitable for use herein is sold under the name "DARCO KB" by American Norit Co, Inc. of Atlanta Ga. (USA). The activated carbon is then combined with deaerated water to form a slurry. A slurry is used in order to promote better mixing of the activated carbon with the fermented product. In a preferred embodiment, the slurry will contain about 15–40% by weight activated carbon which is achieved by using about 1.2–3.4 lbs. of activated carbon per gallon of deaerated water. The slurry is then combined with the fermented product in an amount equal to about 0.15–0.45 lbs. of slurry per gallon of fermented product. The mixture of fermented product and slurry is thereafter agitated for a period of at least about 12.0 hours. The resulting clear and colorless alcohol-containing malt beverage base is then allowed to settle, preferably for a time period of about 6–12 hours to facilitate settling of as much carbon from the malt beverage base as possible.

The colorless malt beverage base is then passed through at least one and preferably two conventional filter systems in order to remove additional carbon and other residual solid materials (e.g. extraneous solid proteins and yeast materials) therefrom. In a preferred embodiment, filtration is accomplished by passage of the colorless malt beverage base through at least one and preferably two beds of diatomaceous earth in order to achieve a turbidity level of less than about 9.0 ppm of residual solids. If this level is not achieved after passage of the colorless malt beverage base through the foregoing multiple beds of diatomaceous earth, additional filtration stages may be used as necessary. In this regard, the present invention shall not be limited to the use of a single or dual stage filtration system.

Furthermore, an optional preservative (e.g. an antimicrobial agent) or combination of preservatives may be added to the colorless malt beverage base before, after, or during filtration. In a preferred embodiment, the preservative or preservatives (if used) are added after the first filtration stage (e.g. after passage of the colorless malt beverage base through the first bed of diatomaceous earth). Likewise, the preferred preservative content (total preservative level) of the colorless malt beverage base will be about 0.0-0.20% by weight thereof, with the final malt beverage product having a total preferred preservative level of about 0.0-0.10% by weight. Exemplary preservative materials suitable for use in the malt beverage product of the present invention include but are not limited to sodium benzoate, potassium sorbate, or a combination of both. The foregoing preservatives are designed to control microbial spoilage of the final malt beverage product in order to maintain a consistent quality level.

A secondary decolorization step may also be used at this stage in the production process to remove residual color from the malt beverage base. For example, activated carbon of the same type described above may be combined with the output from the first or second filter stages for additional decolorization. Specifically, an activated carbon slurry including about 15-40% by weight carbon will be used, which is prepared by combining about 1.2-3.4 lbs. of carbon per gallon of water. About 0.05-0.30 lbs. of slurry are then combined with each gallon of malt beverage base. Once again, additional decolorization is employed when it appears that the primary decolorization stage did not completely remove all of the color from the malt beverage base (which, prior to decolorization, is characterized by a yellowish/brown hue). Nonetheless, in certain instances, additional (e.g. secondary) decolorization may not be necessary and only a single, primary decolorization stage may be needed to achieve decolorization.

The foregoing decolorization materials and procedures are preferred in order to produce the clear and colorless malt beverage base. However, as previously noted, different materials/techniques may be used for decolorization. For example, aside from activated carbon, materials known as "sepiolites" may be used before or after fermentation for decolorization. Sepiolites basically consist of a special group of magnesium silicates having a fibrous structure as described in Rautureau, M., et al., "Structural Analysis of Sepiolite by Selected Area Electron Diffraction - Relations with Physico-Chemical Properties", *Clays and Clat Minerals*, 24:43-49 (1976) which is incorporated herein by reference. When used for decolorization, sepiolites are employed in substantially the same manner as activated carbon (e.g. by direct physical contact between the sepiolites and the materials being decolorized). Thus, while the use of activated carbon for decolorization is preferred, other decolorization materials and methods may be employed, and the present invention shall not be limited to the use of any specific decolorization materials/methods.

The completed clear and colorless alcohol-containing malt beverage base may then be stored (e.g. in conventional "Ruh" storage tanks) prior to producing the completed beverage product, if desired. Storage may be undertaken for a time period of between about 1-60 days or possibly longer if proper procedures are followed. For example, maximum storage life of the malt beverage base is achieved if a pressurized $CO_2$ atmosphere is maintained within the selected storage tanks, and a fluid temperature of about 40.0° F. ($\pm 1.0$ .F) is maintained. It should be noted that storage of the malt beverage base is not required (e.g. for aging or other purposes), and that the malt beverage base may be immediately used to produce the malt beverage product of the present invention.

In order to prepare the completed malt beverage product from the malt beverage base, the base is first passed through at least one and preferably two additional filtration stages. While any suitable filtration procedures and materials may be used, it is again preferred that at least one and preferably two beds of diatomaceous earth be employed to remove residual yeast solids and other extraneous materials. Furthermore, an additional decolorization step may be undertaken either before or after the foregoing filtration stage or stages. For example, an activated carbon slurry of the same type and quantity used to accomplish secondary decolorization may be used for additional decolorization, if necessary. Additional decolorization is employed when it appears that the primary and secondary decolorization stages have not completely removed all of the residual color from the malt beverage base. In the process of the present invention, as many decolorization stages may be used as are necessary to achieve a completely colorless product. Accordingly, the present invention shall not be limited to any specific number of decolorization stages. Also, instead of activated carbon, sepiolites may be used for secondary or supplemental decolorization as previously noted.

Next, deaerated, chilled water (e.g. at a temperature of about 35° F.) is preferably added to the clear and colorless alcohol-containing malt beverage base to obtain the desired level of alcohol in the final malt beverage product. The water may also be slightly carbonated, if desired. In a preferred embodiment, the final malt beverage product will have an alcohol (e.g. ethanol) level of about 3.5-3.9% by weight (about 3.7% by weight=optimum). Since the malt beverage base prepared in accordance with the above-described procedures will have an alcohol (e.g. ethanol) level of about 6.0-8.0% by weight, dilution of the malt beverage base is typically required.

Following dilution, various additional ingredients are added in order to complete the final malt beverage product. These additional ingredients are as follows:

1) A sweetening agent—Exemplary sweetening agents suitable for use in preparing the malt beverage product of the present invention consist of dextrose, sucrose, or corn syrup, with corn syrup (e.g. of the high fructose variety) being preferred. The sweetening agent is preferably added to the malt beverage base so that the base will contain about 0.1-4.0% by weight sweetening agent (e.g. corn syrup) therein.

2) Tartaric acid—In order to achieve proper taste characteristics, a proper acidity/carbonation balance, and to avoid consumer sensations of excess sweetness, excess tartness, and astringency, tartaric acid is used as the primary acidifying agent in the malt beverage product of the present invention. As described in greater detail below, if an additional acid or acids are used in combination with tartaric acid, it is preferred that tartaric acid be present in a greater amount than the combined amount of any other acids in the final product. In a preferred embodiment, the completed malt beverage product of the present invention shall include about 0.05–0.25% by weight tartaric acid therein.

3) A secondary acid—If desired, an optional secondary acid (or multiple secondary acids) different from tartaric acid may be combined with tartaric acid to produce the final malt beverage product. Exemplary secondary acids will include but not be limited to malic acid, fumaric acid, citric acid, or combinations thereof, with citric acid being preferred. As noted above, in order to achieve proper sweetness and acidity levels, it is preferred that the amount of tartaric acid be equal to or greater than the amount of any other acid materials combined therewith (e.g. the amount of secondary acid or secondary acid materials in combination should not exceed the amount of tartaric acid). Specifically, if one or more secondary acid materials are used (e.g. tartaric acid in combination with citric acid and/or other acid materials), an optimum balance of sweetness and acidity will be achieved if tartaric acid comprises at least about 80.0% by weight of the total amount of acids used in preparing the final malt beverage product. Furthermore, in order to achieve optimum flavor, sweetness, acidity, and carbonation characteristics, the completed malt beverage product will include about 0–0.05% by weight secondary acid or acids (in combination).

3) A buffering agent—In order to achieve maximum product stability and constant taste/flavor characteristics, it is preferred that a buffering agent be added in an amount sufficient to maintain the final malt beverage product at a pH of about 2.8–3.4. Tests have shown that product stability may decline if the final malt beverage product has a pH less than about 2.8. The amount of buffering agent in the final malt beverage product may be selectively varied, depending on the ambient pH level of the malt beverage base prior to completion of the final product, which is normally about 4.2–4.8. However, in accordance with the production parameters set forth herein, optimal results are achieved when the final malt beverage product includes about 0.001–0.005% by weight buffering agent. Exemplary buffering agents may involve any conventional buffering agents used in the production of beverage materials, including but not limited to potassium citrate, potassium tartrate, or sodium citrate, with sodium citrate being preferred.

4) A flavoring agent—A selected flavoring agent is added to the beverage base in order to impart desired flavor characteristics thereto. The flavoring agent may involve a wide variety of commercially available concentrated materials from numerous companies including but not limited to Tastemaker, Inc. of Cincinnati Ohio (USA), International Flavors and Fragrances, Inc. of Dayton N.J. (USA), Bell Flavors and Fragrances, Inc. of Northbrook Ill. (USA) and Firmenich, Inc. of Princeton, N.J. (USA). The flavoring agent may have the following desired flavor characteristics: strawberry (Tastemaker Natural Flavor # 211675), lemon lime (Tastemaker Natural Flavor # 211676), grapefruit (Tastemaker Natural Flavor # 211671), cola-rum (Tastemaker Natural Flavor # 211822), margarita-like (Tastemaker Natural Flavor #213922), tangerine (Tastemaker Natural Flavor #211673), and others. More specifically, the present invention shall not be limited to the use of any specific natural or artificial flavor, since virtually any desired flavoring agent may be used. In a preferred embodiment, the selected flavoring agent will be present in the final malt beverage product in an amount equal to about 0.05–0.30% by weight of the final product. However, this amount may be varied, depending on the specific flavoring agent involved and the desired flavor intensity in the final product.

Finally, after addition of the foregoing ingredients to the malt beverage base, the resulting malt beverage product is cooled (e.g. for about 4.0 hours at a preferred temperature of about 32° F. using a conventional heat exchanger system) to achieve "haze" formation and removal. "Haze" materials typically involve protein and tannin complexes which are normally found in malt beverages. To remove haze materials (which precipitate upon cooling), the cooled product is preferably filtered through a sheet filter (e.g. of a type consisting of cellulose material in combination with diatomaceous earth which is commercially available from KLR machines of Bath, N.Y. (USA) and sold under the name/designation "Beco 2015") at a flow rate preferably not exceeding about 31-62 gal./hr./ 1.0 m$^2$ sheet. After filtration, an optional antifoaming agent may be added to the product in order to prevent it from foaming when poured, dispensed, and/or consumed. In a preferred embodiment, the antifoaming agent (if used) will consist of a food-grade silicone-type antifoaming agent which is well known in the art. Exemplary antifoaming agents suitable for use herein are normally proprietary and available from a variety of sources. For example, an antifoaming agent suitable for use herein is commercially available from the Dow Chemical Co. of Midland Mich. (USA) under the name "Antifoam FG-10". Accordingly, the final malt beverage product will preferably contain about 0–0.003% by weight antifoaming agent therein. Also, the antifoaming agent may be added either before, after, or during addition of the other ingredients set forth above.

Finally, the malt beverage product of the present invention is carbonated in a conventional manner to achieve a final carbonation level of about 0.48–0.57% by weight $CO_2$ in the product (e.g. the product will contain about 0.48–0.57% by weight dissolved $CO_2$ therein). To achieve the foregoing carbonation level, carbon dioxide is injected following any and all desired final filtration stages in an amount equal to about 0.03–0.06 lbs. of $CO_2$ per gallon of malt beverage product which is thereafter allowed to equilibrate prior to packaging. In addition, the proper $CO_2$ level is conventionally determined in accordance with procedures well known in the art by measuring the pressure of $CO_2$ evolved from test samples of the malt beverage product by shaking thereof at a selected temperature as described in the 1992 edition of *Methods of Analysis of the American Society of Brewing Chemists*, 8th revised edition published by the American Society of Brewing Chemists, St. Paul Minn., p. Beer-13 which is incorporated herein by reference. As described in greater detail below, the foregoing carbonation level is important and, in combination with the other parameters and materials set forth herein, minimizes/substantially avoids consumer sensations of excess tartness, excess sweetness, and the like.

The final malt beverage product is then preferably packaged in standard 12 ounce bottles or cans for consumer distribution. The bottles may be clear/colorless since the product is not subject to photochemical deterioration. Also, because of a low total sugar level (e.g. a low real extract level) in combination with a relatively high alcohol content, the product does not need to be pasteurized. In a preferred embodiment, the final product will have the following ingredient characteristics set forth in TABLE I as follows:

TABLE I

| Ingredient | Preferred material | Amount (% by wt.) (range) | optimum value |
|---|---|---|---|
| Colorless beverage base | — | 95.4–99.8 | 96.676 |
| sweetening agent | (corn syrup) | 0.1–4.0 | 3.0 |
| tartaric acid | — | 0.05–0.25 | 0.17 |
| secondary acid | (citric acid) | 0.0–0.05 | 0.01 |
| flavoring agent | (see above list) | 0.05–0.30 | 0.10 |
| buffering agent | (sodium citrate) | 0.001–0.005 | 0.003 |
| antifoaming agent | (comm'l silicone type) | 0.0–0.003 | 0.001 |
| preservative | (sodium benzoate) | 0.0–0.05 | 0.02 |
| preservative | (potassium sorbate) | 0.0–0.05 | 0.02 |

Preparation of the malt beverage product of the present invention in accordance with the foregoing parameters results in a product with numerous benefits beyond taste refinement. First, because the final product does not include any non-fermentable sugars therein (e.g. through the use of enzymes and/or high diastatic power malts), consumer sensations of fullness are minimized/substantially avoided compared with sensations of fullness typically experienced when conventional malt beverages are consumed. As noted above, sensations of fullness normally involve feelings of over-consumption and satiation after consuming only moderate amounts of product. The foregoing reduction in non-fermentable sugars results in a corresponding reduction in "real extract" which (as noted above) is term of art involving the total amount of sugars (non-fermentable and fermentable) in a beverage product. In accordance with the materials and production steps set forth herein, the malt beverage product of the present invention will have a real extract content of about 3.5–4.2% by weight, and an alcohol (ethanol) : real extract wt. % ratio of about 1 : 0.4 to 1 : 1.5. More specifically, for each 1% by weight of alcohol in the malt beverage product, there will be about 0.4–1.5% by weight real extract. This favorable ratio results in a product which avoids/minimizes consumer sensations of fullness compared with conventional malt beverage products with substantial amounts of sugars (fermentable and non-fermentable) therein. The foregoing ratio also results in a product with relatively low calories (e.g. 8–15 calories per ounce) which likewise minimizes/avoids consumer sensations of fullness.

In addition, the use of tartaric acid in the amount set forth herein (e.g. 0.05–0.25% by weight) in combination with the above-described carbonation level (e.g. 0.48–0.57% by weight $CO_2$) produces a beverage which minimizes/substantially avoids consumer sensations of excess tartness, excess sweetness, and astringency. As previously noted, the palatability of malt beverage products is not only influenced by the type of ingredients which are used, but how such ingredients interact with each other. For example, the use of different acid materials in malt beverage products ultimately results in different and distinctive flavors which interact unpredictably with various carbonation levels (e.g. dissolved $CO_2$). As a result, varying intensities of tartness and/or variable levels of astringency may result. Excess tartness, sweetness, or astringency levels can prevent acceptance of the malt beverage product by the consuming public. Thus, with respect to malt beverages, the development of specific products with a desired level of tartness, sweetness, astringency, and the like does not merely involve the addition of an acid, flavoring agent, or the like when a specific taste characteristic is desired. Instead, the creation of a malt beverage product with desired taste characteristics not only necessitates the addition of specific acids and the like, but also requires that a wide variety of other factors be considered. These other factors again include the above-described carbonation level, the foregoing tartaric acid level, and the other items stated herein. Accordingly, all of the parameters set forth above (especially the carbonation and tartaric acid levels) cooperate to produce a product which effectively minimizes/substantially avoids sensations of excess tartness, excess sweetness, and astringency, thereby eliminating palatability problems in the completed product.

Decolorization of the malt beverage product (either through the use of activated carbon or sepiolites) offers numerous benefits. Consumers normally consider a darkly-colored brewed beverage product to be heavy, filling, and/or satiating. As previously noted, typical malt beverages either have a natural coloring (e.g. yellow/brown) or are supplemented with additional coloring agents. The production of a clear and colorless malt beverage product provides visual reinforcement of the beneficial characteristics of the present invention, namely, a less filling and less satiating product. In addition to the foregoing benefits, the crystal clear/colorless character of the malt beverage product has a pleasant, fresh, and appealing appearance which is attractive to consumers.

To illustrate the production of a representative sample of the malt beverage product of the present invention, the following Example is provided:

EXAMPLE 599 lbs. of Moravian malt are combined with 285 gallons of water (at a temperature of 122° F.) and 1.06 lbs. of amyloglucosidase in a mixing vessel to produce a mash. The foregoing temperature is maintained for 26 minutes. The temperature is then increased to 150° F. After 40 minutes, the temperature is raised to 162° F. Finally, after 10 minutes, the temperature is increased to 172° F.

The mash is then placed in a lauter tun for the removal of solid materials therefrom and isolation/collection of the liquid fraction (e.g. wort). The collected solid materials in the lauter tun are washed with water maintained at 172° F. to achieve a total liquid volume of 26 bbls. The liquid fraction (e.g. wort) combined with the wash water is then boiled at a temperature of 208° F. in a brew kettle. Twenty minutes after the initiation of boiling, 120 gallons of 95% fermentable corn syrup are added. Immediately thereafter, 4.6 ounces of hop extract are also added. Boiling is allowed to continue for a total of 90 minutes. The fermentable mixture is then pumped through a heat exchanger wherein the temperature thereof is lowered to 50° F. The chilled mixture is thereafter aerated with sterile, filtered air until an $O_2$ level of 8 ppm is attained, and then combined with 20 lbs. of yeast (*Saccharomyces uvarum*) which results in about 35 million yeast cells/ml of the liquid fermentable mixture.

During fermentation of the mixture, the temperature thereof is maintained at about 53° F. Fermentation is allowed to continue over a 10 day period after which all fermentable sugars are converted to alcohol (ethanol). The alcohol level of the resulting fermented product is 7.5% by weight, with a real extract level of about 3.0% by weight. The temperature of the fermented product is then lowered using a conventional heat exchanger to 40° F. Yeast from the fermented product is allowed to settle to the bottom of the fermentation vessel, and is thereafter removed by conventional decantation/flocculation techniques.

The fermented product is thereafter decolorized in order to produce a clear and colorless alcohol-containing malt beverage base. To accomplish decolorization, the fermented product is combined with 198 lbs. of a slurry containing 53 lbs. of activated carbon. This mixture of ingredients is then agitated for 12.0 hours. The activated carbon is thereafter separated and removed by settling and subsequent filtration through dual beds of diatomaceous earth. As a result, a clear and colorless malt beverage base is produced which has an alcohol content of 6.24% by weight. Next, 400 gallons of deaerated and slightly carbonated water are added to the beverage base to achieve an alcohol level of 4.0% by weight.

The base is then combined with 278 lbs. of high fructose corn syrup, 15.8 lbs. of tartaric acid, 0.93 lbs. of citric acid, 0.28 lbs. of sodium citrate, 8.95 lbs. of flavoring agent (selected from the specific flavoring agents listed herein), and 0.093 lbs. of antifoaming agent (e.g. "Antifoam FG 10" from the Dow Corning Company of Midland Mich. (USA)). In addition, 1.86 lbs. of sodium benzoate and 1.86 lbs. of potassium sorbate are added to achieve microbiological stability. Finally, the product is supplemented with 0.042 lbs. of $CO_2$ per gallon of the liquid product so that the final product is 0.50% by weight $CO_2$.

As a result, the final malt beverage product will be entirely clear and colorless, and will have the following characteristics set forth in TABLE II:

TABLE II

| Ingredient | Amount (% by weight) |
| --- | --- |
| Colorless beverage base | 96.676 |
| corn syrup | 3.0 |
| tartaric acid | 0.17 |
| citric acid | 0.01 |
| flavoring agent | 0.10 |
| sodium citrate | 0.003 |
| antifoaming agent | 0.001 |
| sodium benzoate | 0.02 |
| potassium sorbate | 0.02 |

In addition, the final malt beverage product will have an alcohol (ethanol) : real extract wt. % ratio of 1 : 1.06, with a calorie content of 12 calories/ounce.

Having herein described preferred embodiments of the present invention, it is anticipated that suitable modifications may be made thereto by individuals skilled in the art which nonetheless remain within the scope of the invention. Accordingly, the present invention shall only be construed relative to the following claims:

The invention that is claimed is:

1. A colorless, flavored malt beverage product comprising:
   a clear and colorless alcohol-containing malt beverage base produced from the fermentation of an ingredient mixture comprising malt, yeast, a fermentable carbohydrate, and water;
   a sweetening agent;
   about 0.05–0.25% by weight tartaric acid;
   a flavoring agent; and
   a carbonation level of about 0.48–0.57% by weight $CO_2$ in said malt beverage product, said malt beverage product being clear and colorless, having an alcohol : real extract weight % ratio of about 1 : 0.40 to 1 : 1.5, and having a calorie content of about 8 –15 calories per ounce of said malt beverage product, said carbonation level, said calorie content, said alcohol : real extract weight % ratio, and said tartaric acid cooperating to minimize sensations of fullness experienced by consumers of said malt beverage product and to minimize sensations of excess tartness, excess sweetness, and astringency experienced by said consumers.

2. The malt beverage product of claim 1 further comprising an antifoaming agent therein.

3. The malt beverage product of claim 1 further comprising a buffering agent therein.

4. The malt beverage product of claim 3 wherein said buffering agent comprises sodium citrate.

5. The malt beverage product of claim 1 wherein said sweetening agent comprises corn syrup.

6. The malt beverage product of claim 1 wherein said fermentable carbohydrate comprises corn syrup.

7. The malt beverage product of claim 1 further comprising citric acid therein, said citric acid being present in an amount not exceeding that of said tartaric acid.

8. A colorless, flavored malt beverage product comprising:
   about 95.4–99.8% by weight of a clear and colorless alcohol-containing malt beverage base produced from the fermentation of an ingredient mixture comprising malt, yeast, a fermentable carbohydrate, and water;
   about 0.1–4.0% by weight of a sweetening agent;
   about 0.05–0.25% by weight tartaric acid;
   about 0–0.05% by weight of a secondary acid different from said tartaric acid;
   about 0.05–0.30% by weight of a flavoring agent; and
   a carbonation level of about 0.48–0.57% by weight $CO_2$ in said malt beverage product, said malt beverage product being clear and colorless, having an alcohol : real extract weight % ratio of about 1 : 0.40 to 1 : 1.5, and having a calorie content of about 8 –15 calories per ounce of said malt beverage product, said carbonation level, said calorie content, said alcohol : real extract weight % ratio, and said tartaric acid cooperating to minimize sensations of fullness experienced by consumers of said malt beverage product and to minimize sensations of excess tartness, excess sweetness, and astringency experienced by said consumers.

9. The malt beverage product of claim 8 wherein said malt beverage product comprises about 0–0.003% by weight of an antifoaming agent, and about 0.001–0.005% by weight of a buffering agent.

10. The malt beverage product of claim 9 wherein said buffering agent comprises sodium citrate.

11. The malt beverage product of claim 8 wherein said sweetening agent comprises corn syrup.

12. The malt beverage product of claim 8 wherein said fermentable carbohydrate comprises corn syrup.

13. The malt beverage product of claim 8 wherein said secondary acid comprises citric acid.

14. A colorless, flavored malt beverage product comprising:
   about 96.676% by weight of an alcohol containing malt beverage base produced from the fermentation of an ingredient mixture comprising malt, yeast, hops, corn syrup, and water;
   about 3.0% by weight corn syrup;
   about 0.17% by weight tartaric acid;
   about 0.01% by weight citric acid;
   about 0.003% by weight sodium citrate;
   about 0.001% by weight of an antifoaming agent;
   about 0.1% by weight of a flavoring agent; and
   a carbonation level of about 0.48–0.57% by weight $CO_2$ in malt beverage product, said malt beverage product being clear and colorless, having an alcohol : real extract weight % ratio of about 1 : 0.4 to 1 : 1.5, and having a calorie content of about 8–15 calories per ounce of said malt beverage product, said carbonation level, said calorie content, said alcohol : real extract weight % ratio, and said tartaric acid cooperating to minimize sensations of fullness experienced by consumers of said malt beverage product and to minimize sensations of excess tartness, excess sweetness, and astringency experienced by said consumers.

15. A method for manufacturing a colorless, flavored malt beverage product comprising:
   combining malt and water to form a mash having non-fermentable sugars therein;
   adding an enzyme to said mash which is capable of breaking down said non-fermentable sugars to fermentable sugars so that said malt beverage product has an alcohol : real extract weight % ratio of about 1 : 0.40 to 1 : 1.5 with a calorie content of about 8–15 calories per ounce of said malt beverage product;
   heat said mash;
   extracting liquid from said mash;
   combining said liquid with a supply of a fermentable carbohydrate to form a fermentable mixture;
   boiling said fermentable mixture;
   combining said fermentable mixture with yeast after termination of said boiling;
   allowing said yeast to ferment said fermentable mixture for a time period sufficient to convert said supply of fermentable carbohydrate and said fermentable sugars into ethanol in order to produce a fermented product;
   decolorizing said fermented product to thereby produce a clear and colorless alcohol-containing malt beverage base;
   combining said malt beverage base with a sweetening agent, at least one acid, and a flavoring agent in order to produce said malt beverage product, said acid comprising tartaric acid in an amount sufficient so that said malt beverage product comprises about 0.05–0.25% by weight said tartaric acid; and
   carbonating said malt beverage product in order to achieve a carbonation level of about 0.48–0.57% by weight $CO_2$ in said malt beverage product, said carbonation level, said calorie content, said alcohol : real extract weight % ratio, and said tartaric acid cooperating to minimize sensations of fullness experienced by consumers of said malt beverage product and to minimize sensations of excess tartness, excess sweetness, and astringency experienced by said consumers.

16. The method of claim 15 further comprising the step of combining said malt beverage base with an antifoaming agent.

17. The method of claim 15 further comprising the step of combining said malt beverage base with a buffering agent.

18. The method of claim 17 wherein said buffering agent comprises sodium citrate.

19. The method of claim 15 wherein said sweetening agent comprises corn syrup.

20. The method of claim 15 wherein said fermentable carbohydrate comprises corn syrup.

21. The method of claim 15 further comprising the step of adding hops to said fermentable mixture.

22. The method of claim 15 wherein said decolorizing of said fermented product comprises the step of contacting said fermented product with activated carbon.

23. The method of claim 15 wherein said decolorizing of said fermented product comprises the step of contacting said fermented product with sepiolites.

24. The method of claim 15 wherein said enzyme is selected from the group consisting of amyloglucosidase, limit dextrinase, and pullulanase.

25. A method for manufacturing a colorless, flavored malt beverage product comprising:
   combining a high diastatic power malt and water to form a mash so that said malt beverage product has an alcohol : real extract weight % ratio of about 1 : 0.40 to 1 : 1.5 with a calorie content of about 8–15 calories per ounce of said malt beverage product;
   heating said mash;
   extracting liquid from said mash;
   combining said liquid with a supply of a fermentable carbohydrate to form a fermentable mixture;
   boiling said fermentable mixture;
   combining said fermentable mixture with yeast after termination of said boiling;
   allowing said yeast to ferment said fermentable mixture for a time period sufficient to convert said supply of fermentable carbohydrate into ethanol in order to produce a fermented product;
   decolorizing said fermented product to thereby produce a clear and colorless alcohol-containing malt beverage base;
   combining said malt beverage base with a sweetening agent, at least one acid, and a flavoring agent in order to produce said malt beverage product, said acid comprising tartaric acid in an amount sufficient so that said malt beverage product comprises about 0.05–0.25% by weight said tartaric acid; and
   carbonating said malt beverage product in order to achieve a carbonation level of about 0.48–0.57% by weight $CO_2$ in said malt beverage product, said carbonation level, said calorie content, said alcohol : real extract weight % ratio, and said tartaric acid cooperating to minimize sensations of fullness experienced by consumers of said malt beverage product and to minimize sensations of excess tartness, excess sweetness, and astringency experienced by said consumers.

26. A method for manufacturing a colorless, flavored malt beverage product comprising:
- combining malt and water to form a mash having non-fermentable sugars therein;
- adding an enzyme to said mash which is capable of breaking down said non-fermentable sugars to fermentable sugars so that said malt beverage product has an alcohol : real extract weight % ratio of about 1 : 0.40 to 1 : 1.5 with a calorie content of about 8–15 calories per ounce of said malt beverage product;
- heating said mash;
- extracting liquid from said mash;
- combining said liquid with a supply of a fermentable carbohydrate to form a fermentable mixture;
- boiling said fermentable mixture;
- decolorizing said fermentable mixture after termination of said boiling;
- combining said fermentable mixture with yeast;
- allowing said yeast to ferment said fermentable mixture for a time period sufficient to convert said supply of fermentable carbohydrate and said fermentable sugars into ethanol in order to produce a fermented clear and colorless, alcohol-containing malt beverage base;
- combining said malt beverage base with a sweetening agent, at least one acid, and a flavoring agent in order to produce said malt beverage product, said acid comprising tartaric acid in an amount sufficient so that said malt beverage product comprises about 0.05–0.25% by weight said tartaric acid; and
- carbonating said malt beverage product in order to achieve a carbonation level of about 0.48–0.57% by weight $CO_2$ in said malt beverage product, said carbonation level, said calorie content, said alcohol : real extract weight % ratio and said tartaric acid cooperating to minimize sensations of fullness experienced by consumers of said malt beverage product and to minimize sensations of excess tartness, excess sweetness, and astringency experienced by said consumers.

27. A method for manufacturing a colorless, flavored malt beverage product comprising:
- combining malt and water to form a mash having non-fermentable sugars therein;
- adding an enzyme to said mash which is capable of breaking down said non-fermentable sugars to fermentable sugars, said enzyme being selected from the group consisting of
- heating said mash;
- extracting liquid from said mash;
- combining said liquid with a supply of corn syrup and a supply of hops to form a fermentable mixture;
- boiling said fermentable mixture;
- combining said fermentable mixture with yeast after termination of said boiling;
- allowing said yeast to ferment said fermentable mixture for a time period sufficient to convert said supply of corn syrup and said fermentable sugars into ethanol in order to produce a fermented product;
- contacting said fermented product with activated carbon in order to decolorize said fermented product to thereby produce a clear and colorless alcohol-containing malt beverage base;
- combining said malt beverage base with corn syrup, tartaric acid, citric acid, sodium citrate, an antifoaming agent, and a flavoring agent so as produce a malt beverage product comprising about 3.0% by weight said corn syrup, about 0.17% by weight said tartaric acid, about 0.01% by weight said citric acid, about 0.003% by weight said sodium citrate, about 0.001% by weight said antifoaming agent, and about 0.1% by weight said flavoring agent, said malt beverage product being clear and colorless, having an alcohol : real extract weight % ratio of about 1 : 0.4 to 1 : 1.5, and having a calorie content of about 8–15 calories per ounce of said malt beverage product; and
- carbonating said malt beverage product in order to achieve a carbonation level of about 0.48–0.57% by weight $CO_2$ in said malt beverage product, said carbonation level, said calorie content, said alcohol : real extract weight % ratio, said tartaric acid, and said breaking down of said non-fermentable sugars into said fermentable sugars cooperating to minimize sensations of fullness experienced by consumers of said malt beverage product and to minimize sensations of excess tartness, excess sweetness, and astringency experienced by said consumers.

* * * * *

UNITED STATES PATENT AND TRADEMARK OFFICE
CERTIFICATE OF CORRECTION

PATENT NO. : 5,294,450
DATED : March 15, 1994
INVENTOR(S) : KATHRYN M. WORD, et al.

It is certified that error appears in the above-identified patent and that said Letters Patent is hereby corrected as shown below:

Column 9, line 58, "Clat" should read --Clay--.
Column 10, line 10, "(±1.0 .F)" should read --(±1.0°F)--.

In the Claims:

Claim 15, Column 17, line 45, "heat" should read --heating--.

Claim 27, Column 20, line 4, after "consisting of", the rest of the sentence should read --amyloglucosidase, limit dextrinase and pullulanase--.

Signed and Sealed this

Nineteenth Day of July, 1994

Attest:

BRUCE LEHMAN

Attesting Officer       Commissioner of Patents and Trademarks